(12) United States Patent
Eirin

(10) Patent No.: US 8,998,233 B2
(45) Date of Patent: Apr. 7, 2015

(54) MULTI-USE VEHICLE ASSEMBLY

(71) Applicant: Jose M. Eirin, Toronto (CA)

(72) Inventor: Jose M. Eirin, Toronto (CA)

( * ) Notice: Subject to any disclaimer, the term of this patent is extended or adjusted under 35 U.S.C. 154(b) by 72 days.

(21) Appl. No.: 13/755,233

(22) Filed: Jan. 31, 2013

(65) Prior Publication Data

US 2014/0210178 A1    Jul. 31, 2014

(51) Int. Cl.
    *B62K 9/00*      (2006.01)
    *B62K 9/02*      (2006.01)

(52) U.S. Cl.
    CPC .... *B62K 9/00* (2013.01); *B62K 9/02* (2013.01)

(58) Field of Classification Search
    CPC .................................. B62K 9/02; B62K 9/00
    USPC ................................................ 280/259, 79.2
    See application file for complete search history.

(56) References Cited

U.S. PATENT DOCUMENTS

| | | | |
|---|---|---|---|
| 5,273,300 A * | 12/1993 | Wells | 280/259 |
| 5,421,597 A | 6/1995 | Berner | |
| D379,333 S | 5/1997 | Jacobs | |
| 6,705,628 B2 | 3/2004 | Kahmann | |
| 6,742,797 B2 * | 6/2004 | Lopez | 280/287 |
| 6,991,249 B2 | 1/2006 | Shapiro | |
| 7,661,690 B2 * | 2/2010 | McClure | 280/259 |
| D634,245 S | 3/2011 | Liao | |
| 8,465,037 B2 * | 6/2013 | Baron | 280/240 |
| 8,602,432 B2 * | 12/2013 | Baron | 280/240 |
| 2001/0048210 A1 * | 12/2001 | Song | 280/259 |
| 2002/0060438 A1 | 5/2002 | Gartner et al. | |
| 2004/0164515 A1 * | 8/2004 | Gunter et al. | 280/293 |
| 2007/0052198 A1 * | 3/2007 | Kelly | 280/259 |
| 2007/0052199 A1 * | 3/2007 | Schulte et al. | 280/259 |
| 2011/0031708 A1 * | 2/2011 | Cheng | 280/47.38 |
| 2012/0038124 A1 | 2/2012 | Newton, Jr. | |
| 2013/0341884 A1 * | 12/2013 | Raphael | 280/259 |

* cited by examiner

*Primary Examiner* — Kevin Hurley
*Assistant Examiner* — Marlon Arce

(57) ABSTRACT

A multi-use vehicle assembly provides a means for entertainment and mobilization. The vehicle assembly includes a frame assembly having a first frame coupled to a second frame. The frame assembly has a center frame coupled to and extending between the first frame and the second frame. A plurality of wheels is coupled to the frame assembly. The plurality of wheels comprises a left back wheel, a right back wheel, and a central front wheel. The left back wheel is coupled to the first frame. The right back wheel is coupled to the second frame. The central front wheel is coupled to the center frame. A steering mechanism is coupled to the frame assembly. The steering mechanism is mechanically coupled to the central front wheel. A drive system is operationally coupled to one of the plurality of wheels.

8 Claims, 6 Drawing Sheets

MULTI-USE VEHICLE ASSEMBLY

BACKGROUND OF THE DISCLOSURE

Field of the Disclosure

The disclosure relates to vehicle assemblies and more particularly pertains to a new vehicle assembly for entertainment and mobilization.

SUMMARY OF THE DISCLOSURE

An embodiment of the disclosure meets the needs presented above by generally comprising a frame assembly having a first frame coupled to a second frame. The frame assembly has a center frame coupled to and extending between the first frame and the second frame. A plurality of wheels is coupled to the frame assembly. The plurality of wheels comprises a left back wheel, a right back wheel, and a central front wheel. The left back wheel is coupled to the first frame. The right back wheel is coupled to the second frame. The central front wheel is coupled to the center frame. A steering mechanism is coupled to the frame assembly. The steering mechanism is mechanically coupled to the central front wheel. A drive system is operationally coupled to one of the plurality of wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
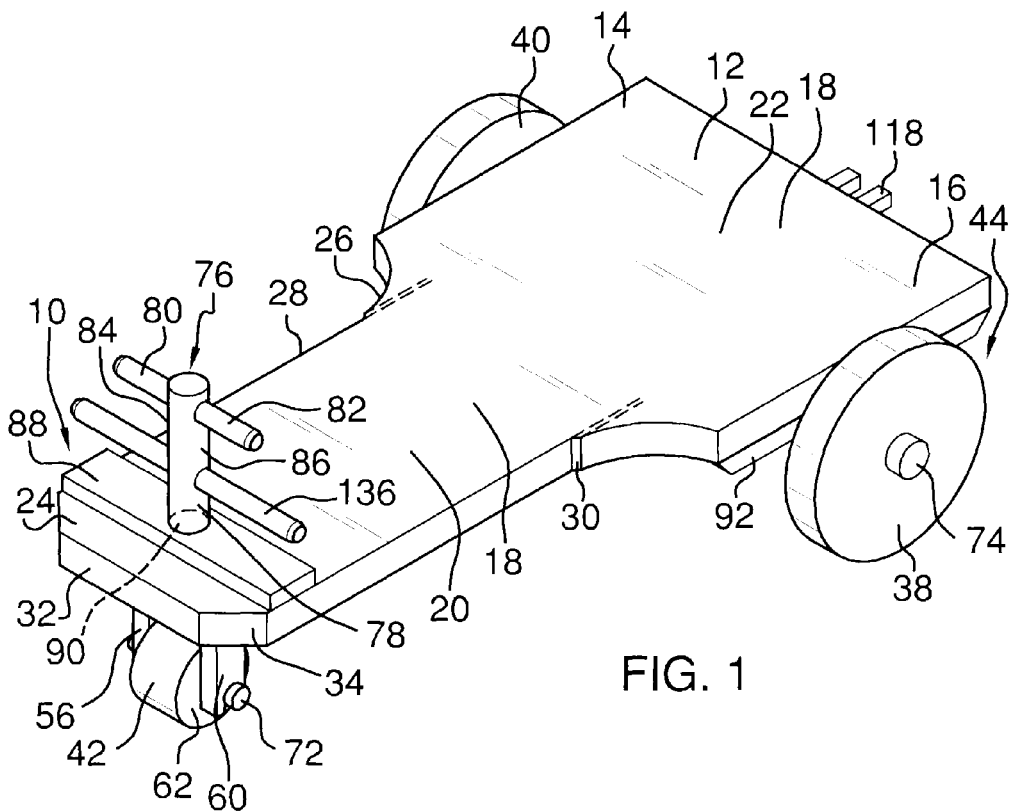
FIG. 1 is a top front side perspective view of a multi-use vehicle assembly according to an embodiment of the disclosure.
Figure 2:
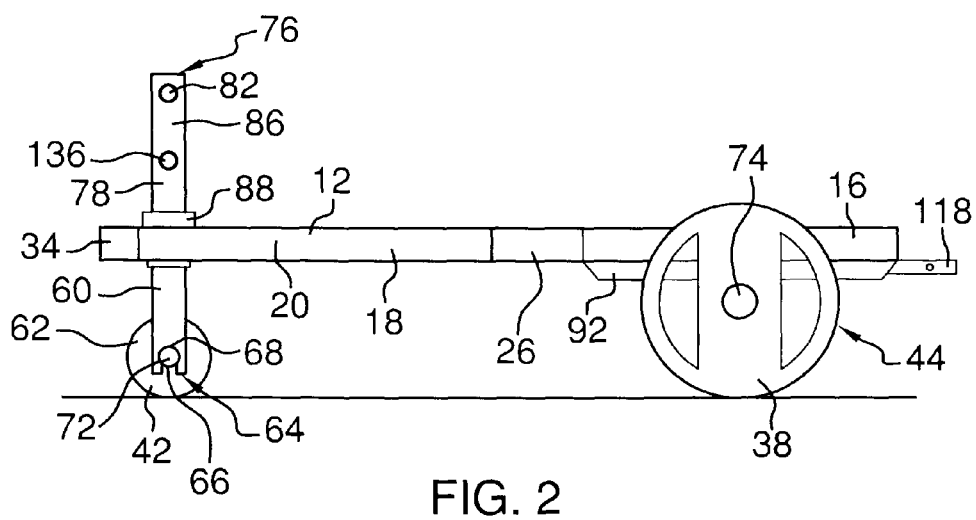
FIG. 2 is a side view of an embodiment of the disclosure.
Figures 3, 4:
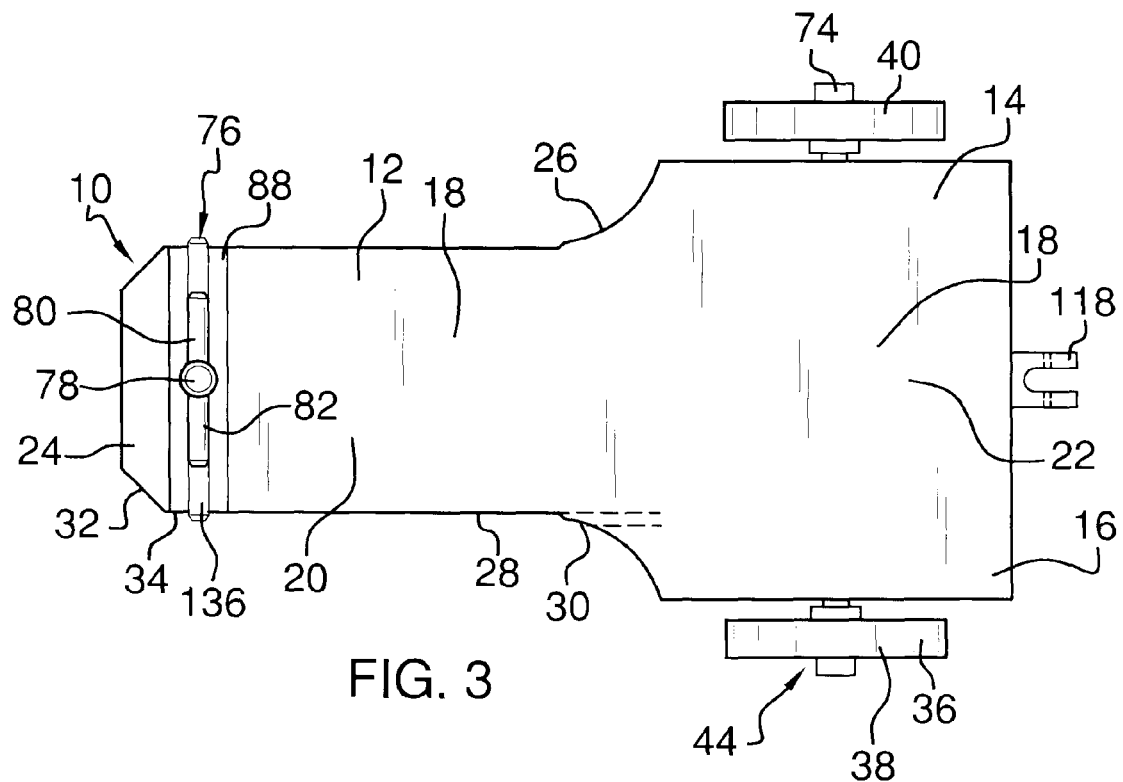
FIG. 3 is a top view of an embodiment of the disclosure.
FIG. 4 is a front view of an embodiment of the disclosure.
Figure 5:
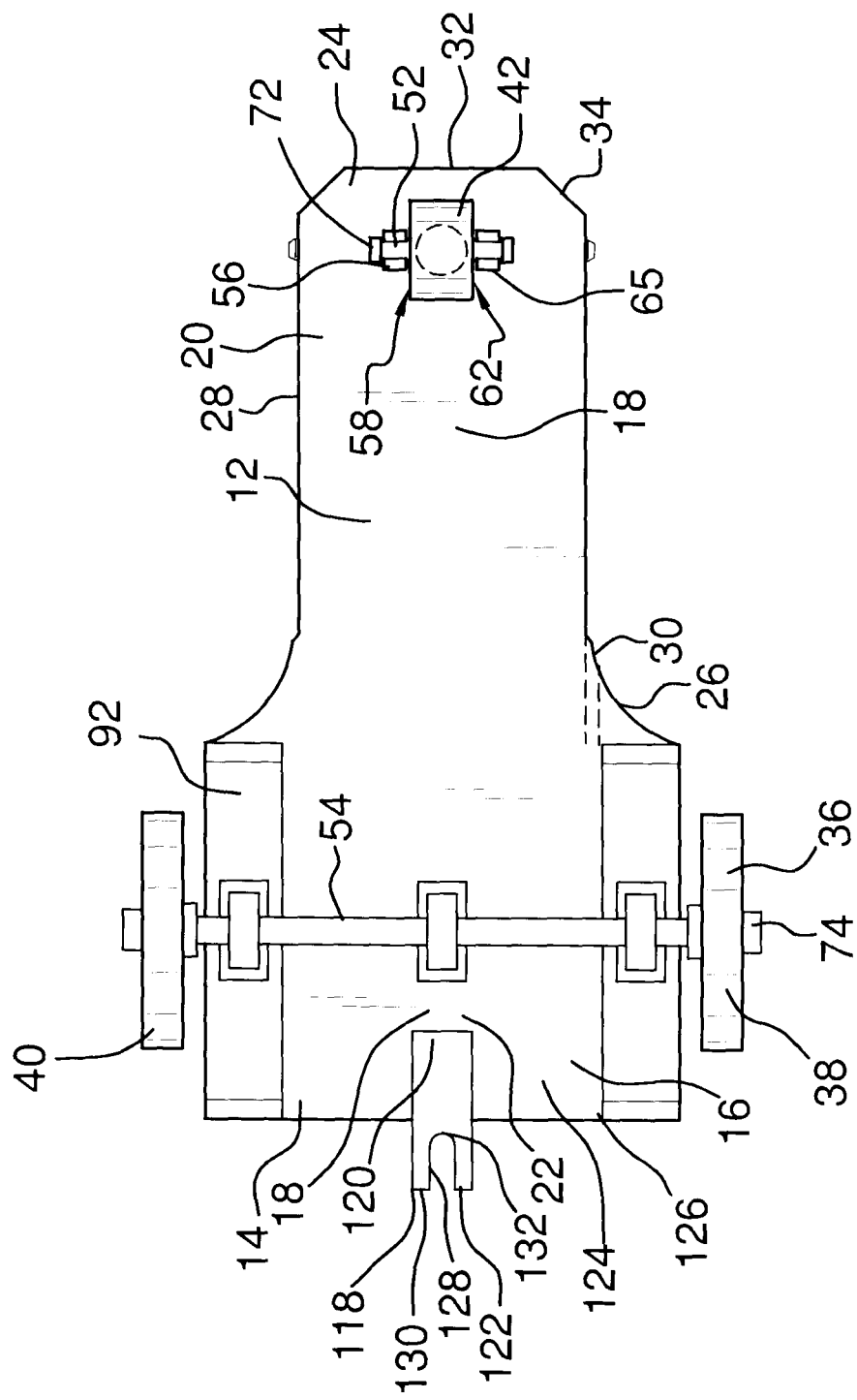
FIG. 5 is a bottom view of an embodiment of the disclosure.
Figure 6:
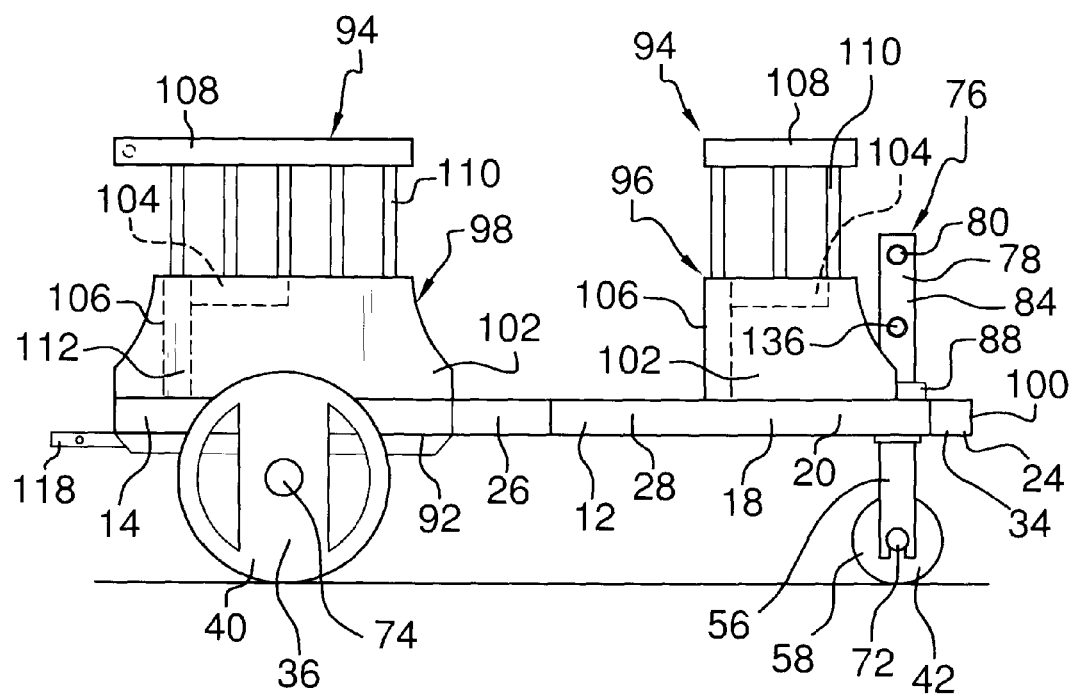
FIG. 6 is a side view of an embodiment of the disclosure.
Figure 7:
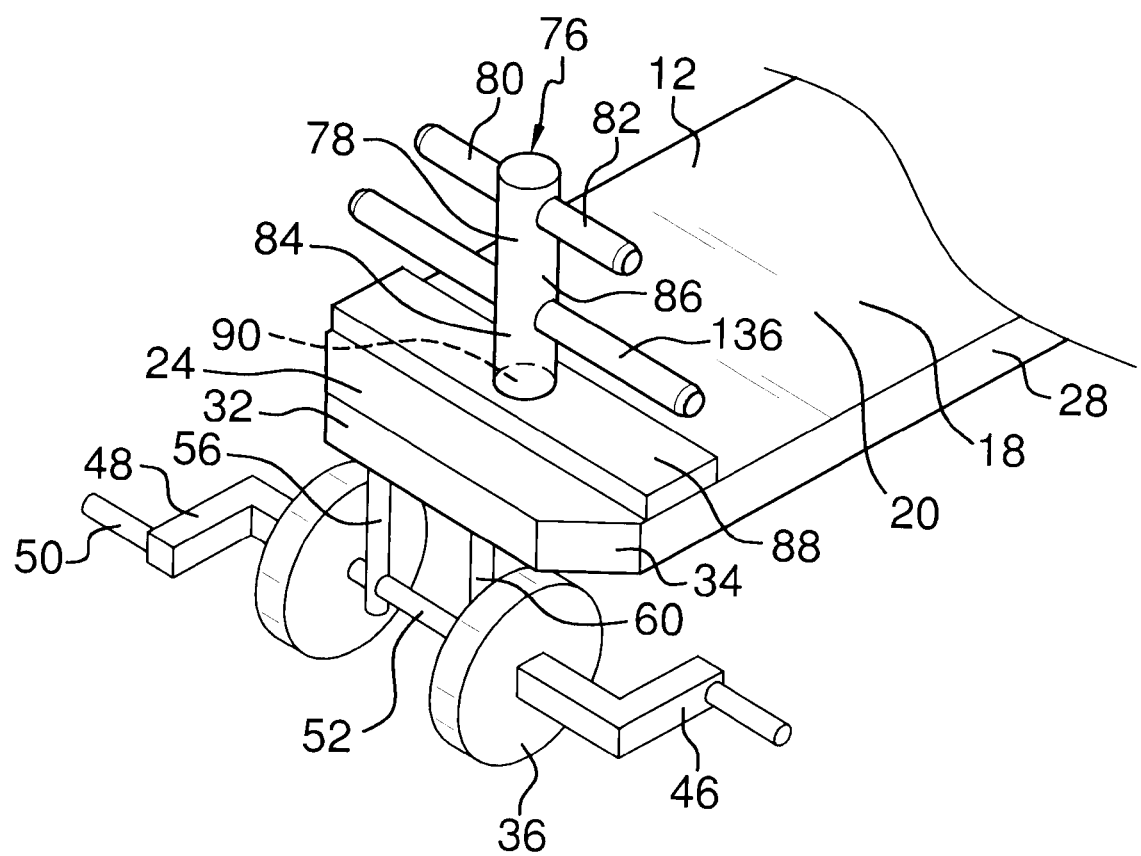
FIG. 7 is a top front side perspective view of an embodiment of the disclosure.
Figure 8:
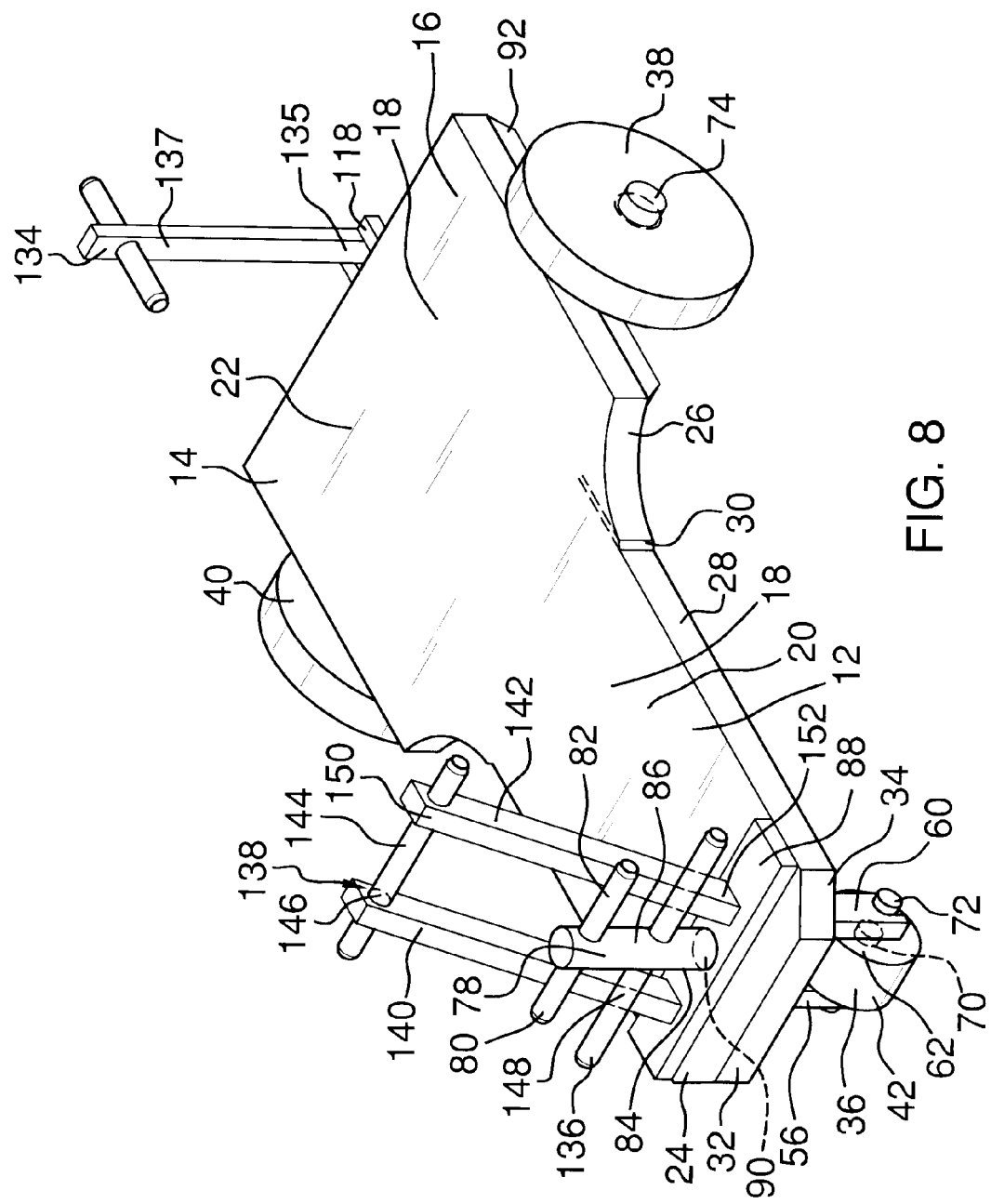
FIG. 8 is a top front side perspective view of an embodiment of the disclosure.

With reference now to the drawings, and in particular to FIGS. 1 through 8 thereof, a new vehicle assembly embodying the principles and concepts of an embodiment of the disclosure and generally designated by the reference numeral 10 will be described.

As best illustrated in FIGS. 1 through 8, the multi-use vehicle assembly 10 generally comprises a frame assembly 12 having a first frame 14 coupled to a second frame 16. The first frame 14 and the second frame 16 are laterally aligned. The frame assembly 12 has a center frame 18 comprising a front end 20 and a back end 22. The back end 22 of the center frame 18 is coupled to and extends between the first frame 14 and the second frame 16. The front end 20 of the center frame 18 is coupled to and extends from the back end 22 of the center frame 18. The front end 20 of the center frame 18 has a first portion 24, a curved portion 26, and a straight portion 28 positioned between the first portion 24 and the curved portion 26. The curved portion 26 is offset from the straight portion 28 by a distance 30. The first portion 24 has a front segment 32 and a pair of side segments 34. The side segments 34 are coupled to and extend away from the front segment 32 of the center frame 18 toward the straight portion 28 of the center frame 18.

A plurality of wheels 36 is coupled to the frame assembly 12. The plurality of wheels 36 comprises a left back wheel 38, a right back wheel 40, and a central front wheel 42. The left back wheel 38 is coupled to the first frame 14. The right back wheel 40 is coupled to the second frame 16. The central front wheel 42 is coupled to the center frame 18. A drive system 44 is coupled to the frame assembly 12. The drive system 44 is operationally coupled to the left back wheel 38 and the right back wheel 40. The central front wheel 42 may be one of a pair of central front wheels 42.

A pair of pedals 46 of the drive system 44 is coupled to the center frame 18. Each of the pedals 46 is coupled to the front end 20 of the center frame 18. Each of the pedals 46 has a crank 48 and a body 50. Each of the bodies 50 is coupled to and extends from an associated one of the cranks 48. Each of the bodies 50 is operationally coupled to the central front wheel 42. A central front axle 52 of the drive system 44 is coupled to the frame assembly 12. The central front axle 52 is operationally coupled to each of the pedals 46 wherein the pedals 46 urge the central front axle 52 to rotate. The central front axle 52 is operationally coupled to the central front wheel 42. A rear axle 54 of the drive system 44 is coupled to the frame assembly 12. The rear axle 54 is operationally coupled to the left back wheel 38 and the right back wheel 40.

A first front fork 56 is pivotally coupled to and extends from the center frame 18. The first front fork 56 is coupled to the front end 20 of the center frame 18. The first front fork 56 is coupled to and extends along an outer face 58 of the central front wheel 42. A second front fork 60 is pivotally coupled to and extends from the center frame 18. The second front fork 60 is coupled to the front end 20 of the center frame 18. The second front fork 60 is coupled to and extends along an inner face 62 of the central front wheel 42. Each of the first and second front forks 56, 60 has a bottom side 64 comprising an arcuate medial section 66 wherein the arcuate medial section 66 of each of the first and second front forks 56, 60 define a notch 68 extending into the bottom side 64 of each of the first and second front forks 56, 60. The first front fork 56 and the second front fork 60 are configured for holding the central front wheel 42 in place wherein the central front axle 52 extends through a central aperture 70 in the central front wheel 42 and further extends through the notch 68 of each of the first and second front forks 56, 60. A plurality of front and rear bearings 72, 74 is provided. Each of the front bearings 72 is coupled to the central front axle 52. Each of the rear bearings 74 is coupled to the rear axle 54.

A steering mechanism 76 is coupled to the frame assembly 12. The steering mechanism 76 is mechanically coupled to the central front wheel 42. The steering mechanism 76 comprises a steerer 78, a first handlebar 80, and a second handlebar 82. The steerer 78 has a first side 84 and a second side 86. The first handlebar 80 is pivotally coupled to the first side 84 of the steerer 78. The second handlebar 82 is pivotally coupled to the second side 86 of the steerer 78 wherein pivoting of said first handlebar 80 pivots said first front fork 56 relative to said center frame 18 and pivoting of said second handlebar 82 pivots said second front fork 60 relative to said center frame 18. A front panel 88 is coupled to and extends across the frame assembly 12. The front panel 88 is coupled to the straight portion 28 of the center frame 18 proximate the first portion 24 of the center frame 18. The front panel 88 has a central aperture 90 wherein the steerer 78 extends through the central aperture 90 of the front panel 88. A pair of rear panels 92 is coupled to and extends across the frame assembly 12. One of the rear panels 92 is coupled to the first frame 14, and one of the rear panels 92 is coupled to the second frame 16. One of the rear bearings 74 is positioned below each of the rear panels 92.

A seat assembly 94 is coupled to and extends across the frame assembly 12. The seat assembly 94 has a front seat 96 and a back seat 98. The front seat 96 extends across the front end 20 of the center frame 18. The back seat 98 extends from the first frame 14 to the second frame 16. The front seat 96 is offset from a front edge 100 of the frame assembly 12. The front seat 96 is positioned behind the steering mechanism 76 wherein the steering mechanism 76 is selectively pivotable by a person sitting in the front seat 96. Each of the front and back seats 96, 98 has a pair of sides 102, a lower panel 104, and a back 106. The lower panel 104 and the back 106 are coupled to and extend between the sides 102 of the front and rear seats 96, 98. Each of the sides 102 of the front and rear seats 96, 98 has an arm rest 108 and a plurality of posts 110. The posts 110 of the sides 102 of the front and rear seats 96, 98 are coupled to and extend between the arm rest 108 and a supporting member 112 of each of the sides 102 of the seats 96, 98. The back 106 and the sides 102 of each of the seats 96, 98 have a plurality of posts 110 extending therefrom.

A hitch 118 is coupled to and extends from the frame assembly 12. The hitch 118 has a first end 120 and second end 122. The first end 120 of the hitch 118 is coupled to the back end 22 of the center frame 18. The first end 120 of the hitch 118 is coupled to a bottom face 124 of the frame assembly 12. The second end 122 of the hitch 118 extends from a rear end 126 of the frame assembly 12. The hitch 118 has an arcuate medial segment 128 positioned on a top edge 130 of the hitch 118 defining a cleft 132 extending into the top edge 130 of the hitch 118. A hitching member 134 is coupled to the frame assembly 12. The hitching member 134 has a first end 135 and a second end 137. The first end 135 of the hitching member 134 is positioned in said cleft 132 of said hitch 118. The second end 137 of the hitching member 134 extends from the frame assembly 12 wherein the hitching member 134 is configured for pulling the frame assembly 12.

A pair of support members 136 is coupled to the frame assembly 12. Each of the support members 136 is coupled to and extends from the steerer 78. The support members 136 are vertically aligned and positioned below the first and second handlebars 80, 82. A handle 138 is coupled to the frame assembly 12. The handle 138 is coupled to and extends from the support members 136. The handle 138 has a first panel 140, a second panel 142, and a crossbar 144. Each of the first and second panels 140, 142 has an upper aperture 146 and a lower aperture 148 wherein the support members 136 extend between the first and second panels 140, 142 through each of the lower apertures 148 of the first and second panels 140, 142. The crossbar 144 extends between the first and second panels 140, 142 through each of the upper apertures 146 of the first and second panels 140, 142. Each of the upper apertures 146 of the first and second panels 140, 142 is positioned on a first side 150 of the first and second panels 140, 142. Each of the lower apertures 148 of the first and second panels 140, 142 is positioned on a second side 152 of the first and second panels 140, 142. A bicycle attachment may be provided and coupled to the crossbar 144 of the handle 138 and to the bicycle wherein the bicycle is configured for pulling the frame assembly 12 when the bicycle attachment is coupled to the handle 138 and the bicycle. The vehicle assembly 10 may be made from recycled or recyclable materials. The vehicle assembly 10 may be disassembled without any tools.

The steerer 78 has a width between approximately 2 centimeters and 10 centimeters. The length from the first handlebar 80 to the second handlebar 82 is between approximately 25 centimeters and 45 centimeters. The left back wheel 38 and the right back wheel 40 have a diameter between approximately 25 centimeters and 55 centimeters. The central front wheel 42 has a diameter of approximately 10 centimeters and 25 centimeters. The pair of central front wheels 42 has a diameter of approximately 25 centimeters and 55 centimeters. The handle 138 has a length between approximately 75 centimeters and 105 centimeters. The height of the center frame 18 from a ground surface is between approximately 20 centimeters and 50 centimeters. The front panel 88 has a width between approximately 45 centimeters and 75 centimeters. The combined length of the pair of support members 136 is between approximately 40 centimeters and 60 centimeters. The length between the sides 102 of the back seat 98 is between approximately 55 centimeters and 80 centimeters. The length between the sides 102 of the front seat 96 is between approximately 25 centimeters and 55 centimeters. The width between the first frame 14 and the second frame 16 is between approximately 75 centimeters and 95 centimeters. The length from the front edge 100 of the frame assembly 12 to the back 106 of the back seat 98 is between approximately 150 centimeters and 205 centimeters. The lower panel 104 of the back seat 98 has a width between approximately 35 centimeters and 65 centimeters. The lower panel 104 of the front seat 96 has a width between approximately 15 centimeters and 40 centimeters.

In use, as stated above and shown in the Figures, a user is positioned on the frame assembly 12. When a user rotates the pedals 46 or is pulled by the hitching member 134 or the handle 138, the left back wheel 38, the right back wheel 40, and the central front wheel 42 rotate and propel the user. The user guides the frame assembly 12 by pivoting the first and second handlebars 80, 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A multi-use vehicle assembly comprising:
   a frame assembly having a a center frame portion coupled to and extending between a first frame portion and a second frame portion;
   a plurality of wheels coupled to said frame assembly, said plurality of wheels comprising a left back wheel, a right back wheel, and a central front wheel, said left back wheel being coupled to said first frame portion, said right back wheel being coupled to said second frame portion, said central front wheel being coupled to said center frame portion, said central front wheel being one of a pair of central front wheels;
   a steering mechanism coupled to said frame assembly, said steering mechanism being mechanically coupled to said central front wheel;
   a drive system operationally coupled to said central front wheel, said drive system comprising a pair of pedals coupled to said center frame portion, said drive system comprising a central front axle coupled to said frame assembly, said central front axle being operationally coupled to said pedals whereby said pedals urge said central front axle to rotate;
   a seat assembly coupled to and extending across said frame assembly, said seat assembly having a front seat and a back seat, said front seat extending across a front end of said center frame portion, said back seat extending from said first frame portion to said second frame portion; and
   a hitch coupled to and extending from said frame assembly.

2. The assembly of claim 1, further comprising said first frame portion and said second frame portion being laterally aligned.

3. The assembly of claim 1, further comprising:
   a first front fork pivotally coupled to and extending from said center frame portion, said first front fork being coupled to a front end of said center frame portion, said first front fork being coupled to and extending along an outer face of said central front wheel;
   a second front fork pivotally coupled to and extending from said center frame portion, said second front fork being coupled to said front end of said center frame portion, said second front fork being coupled to and extending along an inner face of said central front wheel; and
   said steering mechanism comprising a steerer, a first handlebar, and a second handlebar, said steerer having a first side and a second side, said first handlebar being pivotally coupled to said first side of said steerer, said second handlebar being pivotally coupled to said second side of said steerer wherein pivoting of said first handlebar pivots said first front fork relative to said center frame portion and pivoting of said second handlebar pivots said second front fork relative to said center frame portion.

4. The assembly of claim 1, further comprising a front panel coupled to and extending across said frame assembly, said front panel being coupled to a straight portion of said center frame portion proximate a first portion of said center frame portion, said front panel having a central aperture wherein said steering mechanism extends through said central aperture of said front panel.

5. The assembly of claim 1, further comprising a pair of rear panels coupled to and extending across said frame assembly, one of said rear panels being coupled to said first frame portion, one of said rear panels being coupled to said second frame portion.

6. The assembly of claim 1, further comprising a hitching member having a first end and a second end, said first end of said hitching member being positioned in a cleft of said hitch, said second end of said hitching member extending from said frame assembly wherein said hitching member is configured for pulling the frame assembly.

7. The assembly of claim 1, further comprising a handle coupled to said frame assembly.

8. A multi-use vehicle assembly comprising:
   a frame assembly having a first frame portion coupled to a second frame portion, said first frame portion and said second frame portion being laterally aligned, said frame assembly having a center frame portion comprising a front end and a back end, said back end of said center frame portion being coupled to and extending between said first frame portion and said second frame portion, said front end of said center frame portion being coupled to and extending from said back end of said center frame portion;
   a plurality of wheels coupled to said frame assembly, said plurality of wheels comprising a left back wheel, a right back wheel, and a central front wheel, said left back wheel being coupled to said first frame portion, said right back wheel being coupled to said second frame portion, said central front wheel being coupled to said center frame portion;
   a pair of pedals is coupled to said center frame portion, each of said pedals being coupled to said front end of said center frame portion, each of said pedals having a crank and a body, each of said bodies being coupled to and extending from an associated one of said cranks, each of said bodies being operationally coupled to said central front wheel;
   a central front axle is coupled to said frame assembly, said central front axle being operationally coupled to each of said pedals wherein said pedals urge said central front axle to rotate, said central front axle being operationally coupled to said central front wheel;
   a rear axle is coupled to said frame assembly, said rear axle being operationally coupled to said left back wheel and said right back wheel;
   a first front fork pivotally coupled to and extending from said center frame portion, said first front fork being coupled to said front end of said center frame portion, said first front fork being coupled to and extending along an outer face of said central front wheel;
   a second front fork pivotally coupled to and extending from said center frame, said second front fork being coupled to said front end of said center frame portion, said second front fork being coupled to and extending along an inner face of said central front wheel, each of said first and second front forks having a bottom side comprising an arcuate medial section wherein said arcuate medial section of each of said first and second front forks defines a notch extending into said bottom side of each of said first and second front forks, said first front fork and said second front fork being configured for holding said central front wheel in place wherein said central front axle extends through a central aperture in said central front wheel and further extends through said notch of each of said first and second front forks;
   a plurality of front bearings, each of said front bearings being coupled to said central front axle;
   a plurality of rear bearings, each of said rear bearings being coupled to said rear axle;
   a steering mechanism coupled to said frame assembly, said steering mechanism being mechanically coupled to said central front wheel, said steering mechanism comprising a steerer, a first handlebar, and a second handlebar, said steerer having a first side and a second side, said first handlebar being pivotally coupled to said first side of said steerer wherein pivoting of said first handlebar pivots said first front fork relative to said center frame portion, said second handlebar being pivotally coupled to said second side of said steerer wherein pivoting of said second handlebar pivots said second front fork relative to said center frame portion;

a front panel coupled to and extending across said frame assembly, said front panel being coupled to said center frame portion, said front panel having a central aperture wherein said steerer of said steering mechanism extends through said central aperture of said front panel;

a pair of rear panels coupled to and extending across said frame assembly, one of said rear panels being coupled to said first frame portion, one of said rear panels being coupled to said second frame portion, one of said rear bearings being positioned below each of said rear panels;

a seat assembly coupled to and extending across said frame assembly, said seat assembly having a front seat and a back seat, said front seat extending across said front end of said center frame portion, said back seat extending from said first frame portion to said second frame portion, said front seat being offset from a front edge of said frame assembly, said front seat being positioned behind said steering mechanism wherein said steering mechanism is selectively pivotable by a person sitting in said front seat, each of said front and back seats having a pair of sides, a lower panel, and a back, said lower panel and said back coupled to and extending between said sides of said front and rear seats, each of said sides of said front and rear seats having an arm rest and a plurality of posts, said posts of said sides being coupled to and extending between said arm rest and a supporting member of each of said sides of said seats, said back and said sides of each of said seats having a plurality of posts extending therefrom;

a hitch being coupled to and extending from said frame assembly, said hitch having a first end and second end, said first end of said hitch being coupled to said back end of said center frame portion, said first end of said hitch being coupled to a bottom face of said frame assembly, said second end of said hitch extending from a rear end of said frame assembly, said hitch having an arcuate medial segment positioned on a top edge of said hitch defining a cleft extending into said top edge of said hitch;

a hitching member coupled to said frame assembly, said hitching member having a first end and a second end, said first end of said hitching member being positioned in said cleft of said hitch, said second end of said hitching member extending from said frame assembly wherein said hitching member is configured for pulling the frame assembly;

a pair of support members coupled to said frame assembly, each of said support members being coupled to and extending from said steerer, said support members being vertically aligned and positioned below said first and second handlebars; and a handle coupled to said frame assembly, said handle being coupled to and extending from said support members, said handle having a first panel, a second panel, and a crossbar, each of said first and second panels having an upper aperture and a lower aperture wherein said support members extend between said first and second panels through each of said lower apertures of said first and second panels, said crossbar extending between said first and second panels through each of said upper apertures of said first and second panels, each of said upper apertures of said first and second panels being positioned on a first side of said first and second panels, each of said lower apertures of said first and second panels being positioned on a second side of said first and second panels.

\* \* \* \* \*